Figure 1:
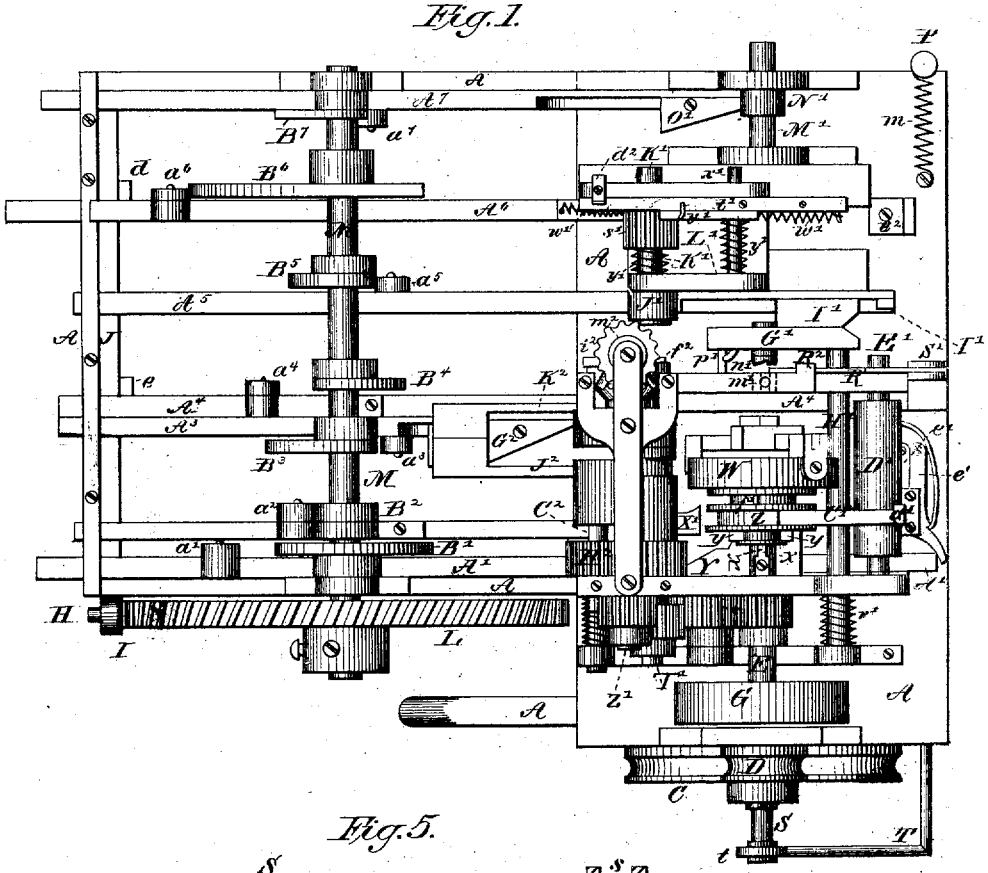

BEST AVAILABLE COPY

F. CURTIS,

Assignor of three-fourths interest to H. DEVENS.

Machine for Making Machine-Screws.

No. 9,086. Reissued Feb. 17, 1880.

*Attest:*
Hannah L. Galloup
Wm Arminwall

*Inventor:*
Francis Curtis
by E. F. Hodges his atty

F. CURTIS,

Assignor of three-fourths interest to H. DEVENS.

Machine for Making Machine-Screws.

No. 9,086. Reissued Feb. 17, 1880.

*Attest:*

Hannah L. Galloup.

Wm. Aspinwall

*Inventor:*

Francis Curtis by E. F. Hodges his atty

F. CURTIS,

Assignor of three-fourths interest to H. DEVENS.

Machine for Making Machine-Screws.

No. 9,086. Reissued Feb. 17, 1880.

Attest:
Hannah L. Galloup.
Wm Aspinwall

Inventor:
Francis Curtis
by E. F. Wedges his atty

F. CURTIS,

Assignor of three-fourths interest to H. DEVENS.

Machine for Making Machine-Screws.

No. 9,086. Reissued Feb. 17, 1880.

Attest:
Hannah L. Galloup.
Wm. Aspinwall

Inventor:
Francis Curtis
by E. F. Hodges his att'y

UNITED STATES PATENT OFFICE.

FRANCIS CURTIS, OF BRATTLEBOROUGH, VERMONT, ASSIGNOR OF THREE-FOURTHS OF HIS INTEREST TO HENRY DEVENS, OF SAME PLACE.

MACHINE FOR MAKING MACHINE-SCREWS.

SPECIFICATION forming part of Reissued Letters Patent No. 9,086, dated February 17, 1880.

Original No. 120,044, dated October 17, 1871. Application for Reissue filed October 1, 1879.

*To all whom it may concern:*

Be it known that I, FRANCIS CURTIS, of Brattleborough, in the county of Windham and State of Vermont, have invented certain new and useful Improvements in Screw-Machines; and I do hereby declare that the following is a full, clear, and exact description, reference being had to the accompanying drawings, and to the letters of reference marked thereon, making a part of this specification.

The nature of my invention consists in the construction and arrangement of a screw-machine, as will be hereinafter more fully set forth.

My invention has reference to that class of machines in which the rough rod or wire of metal, of sufficient size to form the head of the desired screw, is introduced to a continually-revolving chuck, by the chuck conducted to the operating-tools, by which a screw is partially finished, and then separated in some manner from the rod, to be completed elsewhere; and its object is to provide a machine that will automatically and continually produce perfectly-finished machine-screws, the length of the rod supplied to the chuck being the only limit to such continuity.

Heretofore it has been common to the art to move the rod forward the proper distance to form a screw, and then operate upon it successively with the requisite tools moved to and from it.

In my machine a chuck is so connected and operated that it grasps the rod firmly, and, moving forward, feeds it to tools that form the body and thread of the screw.

Using the chuck as a feeding device constitutes the first part of my invention.

Before my invention no means existed whereby the screw-blank, after having the thread cut, could be retained in the die and completely severed from the rod while secured in and revolving with the chuck. By my method the die, after it has advanced and cut the screw-thread the proper length upon the rod, is allowed to revolve in unison with the rod, receiving motion therefrom, until the screw-blank held in the die is severed from the rod by the parting-tool, and from that time retaining it in the die, which is used as a carrier to bear it to the various tools required to perfect it, the said tools being arranged on one plane, as shown and described hereinafter.

In so arranging the die and its attachments as to allow it to revolve in unison with the rod from the time the screw-thread is cut until the rod is severed forms the second part of my invention.

Using the rod secured in the chuck as the medium to communicate motion to the die is the third part of my invention.

In using the die as a carrier for the partially-finished screw-blank to the various finishing-tools constitutes the fourth part of my invention.

Heretofore machines of this class have required for feeding the wire a constant attendant. My machine does not, acting in this respect automatically. I have, by a combination of the rod operated upon and the chuck acting as a feeding device, provided a means of stopping the operating parts of my machine when the length of rod is nearly exhausted, and in this combination is found the fifth part of my invention.

The production of a perfectly-automatic machine for the manufacture of machine-screws from a rod of metal, constructed and operating as hereinafter described, is my whole invention.

To make my description more readily understood I should here say the motions of my machine are of three kinds: first, the usual revolution of shafts communicated from the source of power by pulleys, belts, and gears; second, lateral movements in a forward direction produced, measured, and controlled by cams upon the cam-shaft, and acting directly through sliding bars, wedges, and other devices to accomplish the positive work of making the screws; and, third, lateral movements backward, effected by springs employed to restore the parts to their normal position, ready to be again put in service by the cam-shaft and its associated mechanism.

Expressing in detail the operations upon the rod required to perfect one screw, they are, viz: The rod is introduced into the tube S, which is embraced in and carried by the hollow spindle E; then firmly grasped by the chuck W;

by it carried forward the proper distance to allow the body of the rod to be reduced by the tool $n'$ to the size required for the thread of the screw; the thread cut by a die, J'; the partially-formed screw separated from the rod by a parting-tool, R'; the head formed by a header, $f^2$; the slot cut by a saw, $k^2$, and the finished screw removed from the screw by a screw-driver, $i^2$.

In order to enable others skilled in the art to which my invention appertains to make and use the same, I will now proceed to describe its construction and operation, referring to the annexed drawings, in which—

Figure 5:
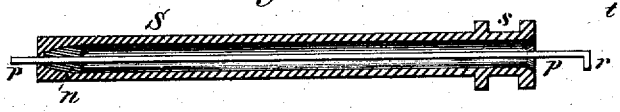
Figure 14:
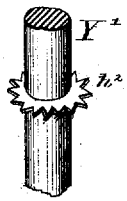
Figure 2:
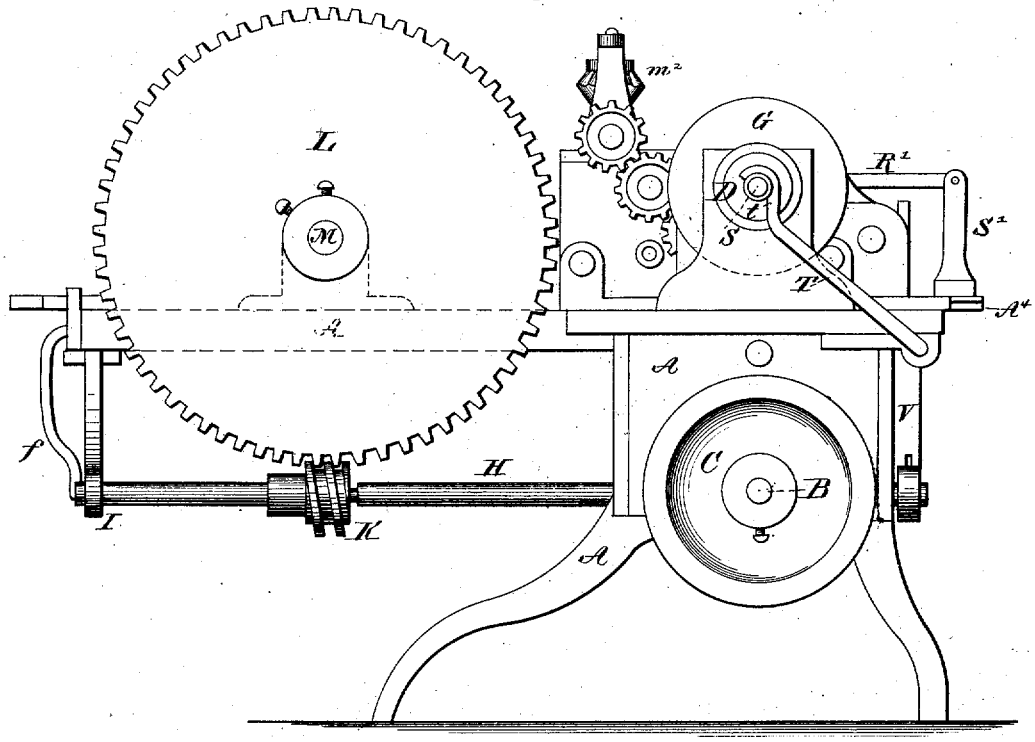
Figure 13:
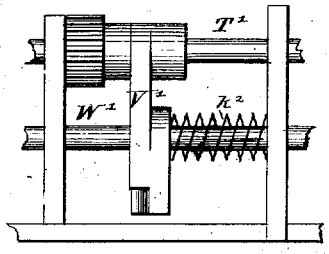
Figure 15:
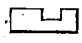
Figure 9:
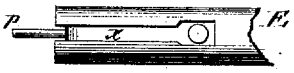
Figure 6:
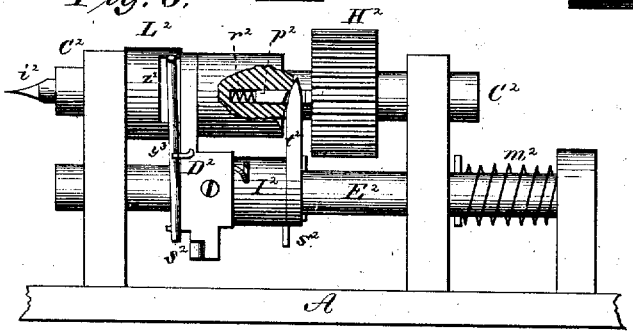
Figure 10:
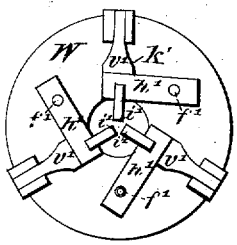
Figure 7:
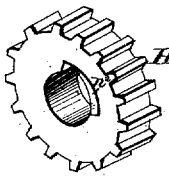
Figure 11:
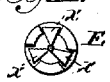
Figure 8:
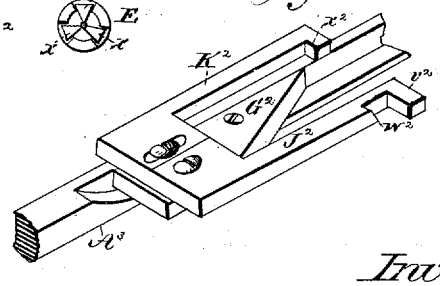
Figure 12:
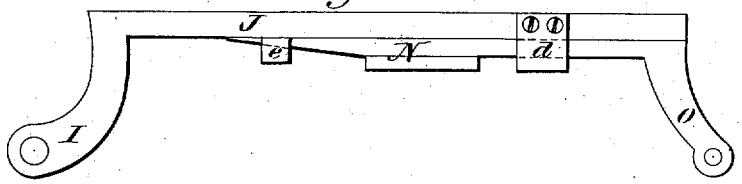

Figure 1 is a plan view of my machine. Fig. 2 is a side view, Fig. 3 a front view, Fig. 4 a bottom view, of the same. Fig. 5 is an enlarged longitudinal section of a hollow tube through which the screw-blank passes. Figs. 6, 7, and 8 are enlarged detached views of the mechanism which operates a screw-driver to release the screws after they are completed. Figs. 9, 10, and 11 are enlarged detached views of the chuck and its attachments. Fig. 12 is a view of a sliding wedge at the rear of the machine. Fig. 13 is a detached view of the mechanism for operating the header. Fig. 14 is a perspective view of the saw that cuts the slot in the screw-head, and Fig. 15 is a side elevation of clog $p^2$.

A represents the frame-work of my machine, constructed in any suitable and convenient manner to support the various parts of which my machine is composed. On the left side of the frame A is a short horizontal shaft, B, passing into the frame and having on its outer end a pulley, C, to which motion is imparted by a belt from a pulley, D, on a hollow spindle, E, located above and parallel with the shaft B. The motion to the hollow spindle is communicated from the motive power through a belt around a pulley, G, on said spindle. Upon the inner end of the shaft B is a miter-wheel, $a$, gearing with a similar wheel, $b$, upon a shaft, H, by which arrangement shaft H revolves with the hollow spindle. The front end of this shaft has a stationary bearing in the front side of the frame A, while its rear end has its bearing in an arm, I, extending from one end of a swinging bar, J, which is located on the inner side of the rear end of the machine.

The opposite end from the arm I of the swinging bar J is pivoted to the frame A, which allows the end with the arm to be raised and lowered at will by means that will be hereinafter described. Upon the shaft H is a worm or screw, K, which is to gear with a large cog-wheel, L, upon the end of a horizontal shaft, M, situated across the rear end of the frame A, and carrying a series of cams for operating the various parts of the machine. When the end of the swinging bar J, with the arm I, is elevated, the worm K gears with the wheel L, and consequently turns the shaft M; but when said swinging bar and arm are allowed to drop down by their own weight the worm will be thrown out of gear with the wheel L and stop the motion of the shaft M. The motion of the swinging bar J is caused by a wedge-shaped bar, N, situated under said swinging bar J and supported by two guides, $d$ and $e$, the former attached to the swinging bar J and the latter to the frame A.

Figure 3:
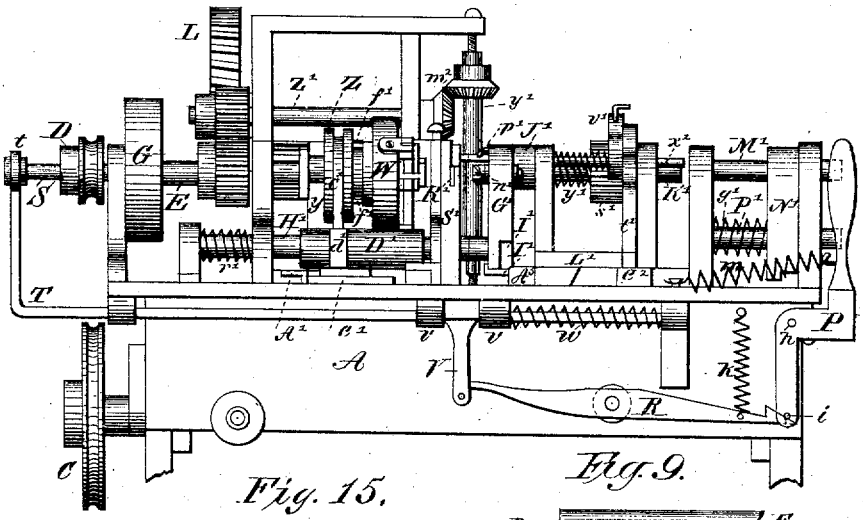
Figure 4:
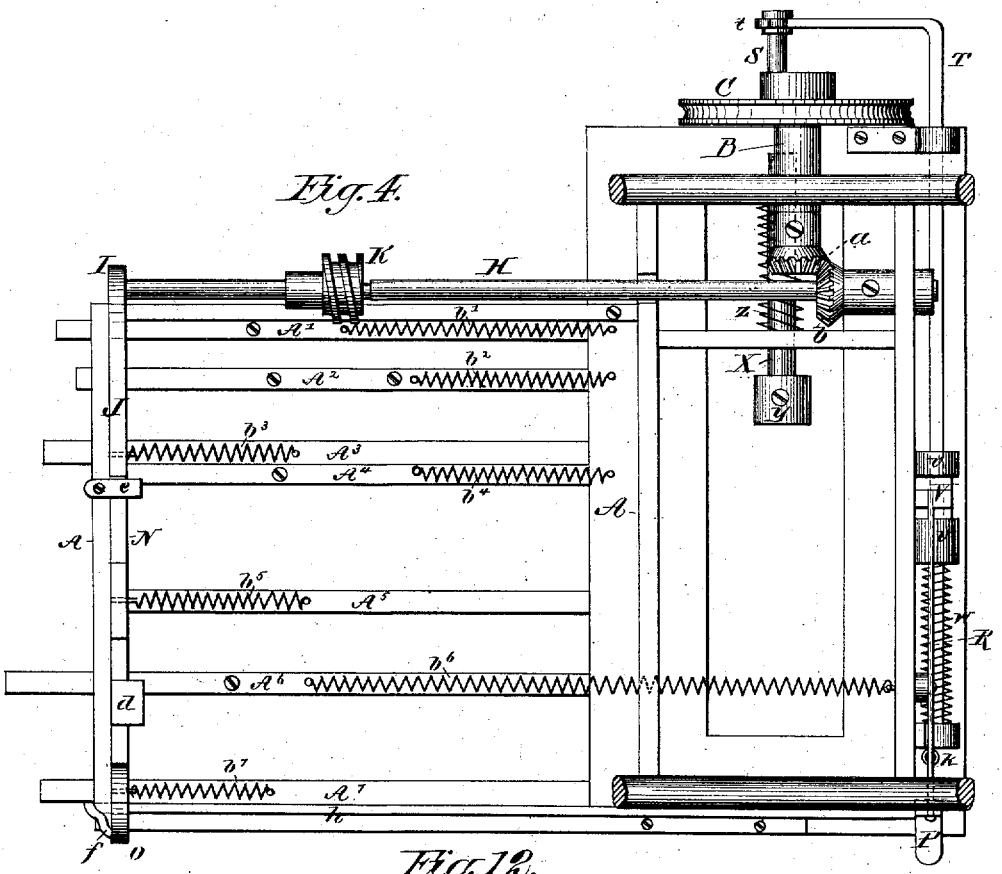

To the end of the wedge-shaped bar N is attached or formed a downwardly-projecting arm, O, in the lower end of which is inserted a crank, $f$, upon a rod, $h$. This rod runs along the opposite side of the frame from the shaft H, and on the front end of said rod $h$ is attached an angular lever, P. The lower end of this lever is forked and has a pin, $i$, through it, which pin is, when said end of the lever P is thrown inward, caught by a hooked lever, R, pivoted on the front side of the frame A, and the hooked end drawn upward by a spring, $k$, as shown in Fig. 3. When the hooked end of the lever R is released from the pin $i$ a spring, $m$, attached to the upper part of the angular lever P, throws the same back into position. The first-described movement of the lever P throws the wedge-shaped bar N inward by turning bar $h$, which operates crank $f$, which, in turn, drives forward O and the bar N, raising the swinging bar J and causing the worm K to gear with the wheel L, while the second movement draws the wedge-shaped bar outward, throwing the worm out of gear.

The throwing out of gear may be performed both by hand and automatically when the rod from which the screws are made is used up. Automatically it is performed in the following manner: In the hollow spindle E is inserted a hollow tube, S, and in the inner end of the same is inserted a small tapering collar, $n$, the hole in which is just large enough for the rod $p$, of which the screws are made, to pass through. The outer end of this rod $p$ is formed with a hook or other projection, $r$, as shown in Fig. 5. As this rod is being fed into the machine the hook $r$ will at last catch on the collar $n$, and said collar, not being able to pass through the inner end of the tube S, must draw the said tube inward farther into the hollow spindle E. Now, upon the outer end of the hollow tube S is a circumferential groove, $s$, formed by flanges or collars attached to the same, or in any other convenient manner. In this groove is laid a hook, $t$, formed upon the end of a bent rod, T, which passes through suitable bearings on the front side of the frame A in such a manner that it can turn in said bearings and also be moved a short distance in and out.

On this rod, at a suitable point, are secured two collars, $v$ $v$, between which, on the rod, is loosely placed an arm, V, the lower end of which is forked or slotted and fits over the inner end of the lever R. The end of this lever grows wider toward the middle, and its under side is an inclined plane. It is supported on the under side by a pin passing through both sides of V. As the tube S is moved inward the rod T is also moved in the same direction, the hook $t$ being laid in the groove $s$, and by this movement of the rod the arm V operates on the inner end of the lever R in such a manner as to release the hooked end of the same from the pin $i$ in the angular lever P, and thus throw the machine out of gear, as above described. A spring, $u$, placed around the rod T, between the inner collar and the inner bearing, throws the rod and its arm out again when the machine is stopped.

The hollow spindle E, Figs. 1, 3, 9, 10, allows the rod to pass through the bearings on A, in which E revolves, guiding it to the chuck. The revolution of E, and, indeed, all the motions of the machine, are caused by power applied to the pulley G, fixed on said spindle, and derived from the driving-shaft by means of a pulley thereon and a belt.

At the outward end of E is a small belt-pulley, D, giving motion to the shaft B through pulley C and a belt. To the right of pulley G, on spindle E, is a gear that transfers motion to the header, the saw, and the screw-driver. On the inner end of E there are formed three longitudinal grooves, Figs. 9 and 11, and three springs (formed from thin metal, so arranged that when open they do not come above the surface of E, are fixed thereon. The outer ends of these springs $x\,x\,x$ are bent at about right angles to their bodies over the end and toward the center of E, the bent ends having V-shaped notches that embrace, press upon, and guide the rod, and cause it to revolve with the spindle and prevent it from moving back with the chuck when it is drawn backward to take another hold.

The chuck W, Figs. 1, 3, 10, is provided with an elongated hub, and so connected with the hollow spindle E that, while free to slide forward and back over the springs $x\,x\,x$, it has coincident revolution therewith, its functions being to receive, firmly grasp, center, and feed forward any desired length of the rod from the hollow spindle to the tool that forms the body of the screw.

The forward motion of the chuck is produced in this manner: Under the bed-plate of the machine is a sliding shaft, X, Fig. 4. Attached to one end of X is a hub, $y$, with a forked arm that connects with a groove cut in the end of the elongated hub of the chuck, Figs. 3, 1. The forked arm $y$ and its connections, including the chuck, are moved forward by wedge Y, Fig. 1, attached to a sliding bar, A′, operated by cam B′, spring $z$ causing the backward motion.

The griping and centering functions of the chuck are accomplished in this manner: Collar Z is arranged to slide forward and back over the elongated hub, Figs. 1, 3. From the face of Z next the chuck three pins, $f'$, project, passing through the chuck to the face side, where they are attached to buttons $h'$. Each of these buttons $h'$ operates a lever, $v'$, to which a jaw, $i'$, is attached, as shown by Fig. 10. Now, when collar Z is moved from the chuck these parts so operate as to shut the jaws $i'$ firmly upon the rod. Reversing the motion reverses the effect. Automatically, this is accomplished by retaining the collar Z stationary, when the chuck commences to move in either direction, as follows: On a sliding shaft, E′, is attached a sleeve, D′, having a forked arm, C′, that enters a groove cut in collar Z, Figs. 1, 3. One side of the sleeve D′ has a pin or arm, $d'$, which is held by a pair of jaws, $e'\,e'$, operated by the end of sliding bar A′. The movement of A′ at the proper time opens said jaws, and permits pin $d'$, sleeve D′, arm C′, and collar Z to move to right or left with the said hub. Supposing the chuck has moved inward on the hollow spindle, and the wedge Y commences to move the chuck forward, at the commencement of this movement the forked arm C′ and the collar Z are held back by a shoulder on the inner jaw $e'$ until the jaws $i'$ $i'$ $i'$ of the chuck have grasped the rod $p$, when the movement of the slide A′ releases the arm C′, when all move forward together. Then, as soon as the screw has been cut off from the rod, as hereinafter described, and the wedge Y is returning to its place, the spring $z$ on the shaft X moves the chuck inward on the hollow spindle again. At the commencement of this inward movement the arm C′ and the collar Z are held stationary by the jaws $e'\,e'$ until the jaws $i'$ $i'$ $i'$ of the chuck are opened by the pins $f'$ in the collar Z, acting through the buttons $h'$, which lets the wire loose. Then the movement of the slide A′ opens the jaws $e'\,e'$, and the entire chuck, comprehending collar Z and hub, moves back to its place on the spindle, ready for another gripe. The rod $p$, as it is fed by the chuck W, as above described, passes through a bushing, $m'$, and is received by the burrer $n'$, which mills the body or shank, and then flies back into its place, leaving the rod in said bushing.

Nothing being claimed on this bushing, I have, in the drawings, only indicated its position by dotted lines in Fig. 1, it being held in place by a set-screw, as shown.

The burrer $n'$, Figs. 1, 3, reduces the diameter of the rod to the proper size for the body of the screw, and is so arranged that while operating it is secured in perfect line, but is entirely removed when the die is cutting the thread.

The burrer $n'$ is placed in a swinging arm, G′, attached to a sliding shaft, H′. This arm and shaft are at the proper time turned toward the rod until a pin or projection on the arm strikes a guide-pin, $p'$, when they are moved inward toward the bushing, (that guides the rod beyond the chuck, Fig. 1,) the pin $p'$ passing through a hole in the upper end of the arm G′. As soon as the burrer has performed its function a spring, $r'$, on the shaft H′ moves said shaft and arm outward from the bushing until the arm has cleared the guide-pin $p'$, when the arm is moved from before the bushing until again required. These movements of the arm and shaft are caused by two wedges, I′ I′, upon the slide-bar $A^5$, operated by cam $B^5$.

The die J′, Figs. 1, 3, first forms the thread as far up as desired, and then, by its combined attachments, is converted into a carrier that presents the head to the various tools required to finish and remove the screw from the machine. This die is connected to one end of a horizontal shaft, K′, (that is capable of end motion toward the hollow spindle and pressed therefrom by the spring $y'$,) carried by and revolving in bearings formed upon a carriage, L′, the line of motion of this carriage being at right angles to the forward motion of the rod.

Shaft K′ is so arranged with reference to revolution that it can be automatically locked or unlocked at any desired time, thus causing the die J′ to be held stationary or allowing it to revolve. This is performed in this manner: Upon shaft K′ there is firmly attached a cog-wheel, $s'$, and upon another shaft, $x'$, parallel with K′ and similarly arranged, are two dogs or arms, each having on its under side a catch or dog, $t'$ $v'$, $t'$ being secured to the shaft $x'$, and of such form that when the carriage L′ is moving to carry the head to be finished one part comes in contact with an incline, $e^2$, and in passing over $e^2$ causes the other part to press down upon the cogs of $s'$, and also to be borne by the spring $y^2$ on the shaft $x'$ under the stationary catch $d^2$, Fig. 1. At the same time the dog V′, which is free upon $x'$, is drawn by spring $w'$ toward cog-wheel $s'$, and its point enters between the cogs and locks said wheel $s'$ and shaft K′. I should say here that the catches or dogs on $t'$ and $v'$ are so arranged relatively to each other that if $t'$ strikes on the top of a cog on $s'$ instead of striking between the cogs, then $v'$ will so enter between two of said cogs as to start the wheel forward or back, and permit $t'$ to enter freely between the cogs. Thus $t'$ and $v'$ serve together in locking said wheel $s'$.

To unlock, there is upon $v'$ a hook-like projection, Fig. 3, that overhangs the part of $t'$ under the stationary catch $d^2$. The spring $w'$, attached to $t'$, is so arranged that it draws the above-mentioned part of $t'$ upward a little stronger than the spring $w'$, attached to $v'$, draws it downward, so that when the thread is being formed by the die J′, as the die moves forward, a flange on the right-hand side of $s'$ strikes the dog on $t'$, and causes the dogs $t'$ $v'$ to move forward with the shaft K′, taking with them the shaft $x'$, and when the thread is cut up the desired length $t'$ is just drawn out from under the catch $d^2$, and the arm of dog $t'$, flying up, strikes the projection upon $v'$, and disconnects the point of $v'$ from the tooth of cog $s'$ that it was resting against, allowing the die J′ and shaft K′ to revolve.

The difference of the intensity of the springs upon $t'$ and $v'$ prevents $v'$ from dropping into contact with the teeth of $s'$ until the spring upon $t'$ has been overcome by the elevation of the opposite end of $t'$, by means of the incline $e^2$, the distance the thread is cut up, the screw-body being determined by the length the catch $d^2$ extends over $t'$.

In order to move the die J′ toward the body of the screw, for the purpose of starting the thread, there is arranged a sliding shaft, M′, provided with a downward-projecting arm, N′, to the lower end of which is attached another sliding shaft, P′, Fig. 3, surrounded by a spring, $g'$, that presses M′ N′ P′ back from the hollow spindle. Now, when the die J′ is in proper line to receive a blank and locked, slide-bar $A^7$, actuated by cam $B^7$, causes the wedge O′, by pressing against arm N′, to force the end of the shaft M′ against the rear end of shaft K′ and bear the die J′ upon the blank, when the screw-thread is cut by the revolution of the rod. When the thread is cut the die J′ revolves with the wire until the parting-tool severs the wire, when the wedge O′ is withdrawn, and springs $y'$ $g'$ force the parts to resume their normal position—*i. e.*, as far back from the hollow spindle as possible. Die J′, now converted into a carrier, is, by motions of carriage L′, positioned for the heading-tool. The head completed, it is passed to the saw which cuts the slot in the surface of the head, and thence to the screw-driver that removes the finished screw, thence back for another blank, these motions being all in one horizontal line, and caused by cam $B^6$ and slide-bar $A^6$, connected to carriage L′.

The parting-tool R′, Figs. 1, 2, 3, separates the partially-formed screw from the rod (leaving a head the desired thickness) as soon as possible after the die has cut the thread and is revolving, R′ being attached to standard S′, fixed on the front end of slide-bar $A^4$, operated at the proper times by cam $B^4$, the operating end of R′ passing through a guide-rest, $R^2$, Fig. 1.

The header $f^2$, Figs. 1, 13, rotates constantly. When die J′, carrying a screw, positions itself, $f^2$ moves forward, shapes the head, and then moves back, allowing J′ to pass farther on. $f^2$ is fixed to the end of shaft T′, parallel with, geared to, and driven by hollow spindle E.

Arm V′, secured to shaft W′, connects T′ and W′, allowing T′ free revolution, but causing T′, V′, and W′ to move toward die J′, when the lower part of U′ is operated upon by wedge X′, attached to slide-bar $A^2$, that is moved by cam $B^2$, spring $K^2$ returning the various parts upon withdrawing wedge X′.

The saw $h^2$, Figs. 1, 2, 3, 14, is circular, in constant motion, and so placed that it cuts the slot across the center of the head as the screw is carried from the header $f^2$ to the screw-driver $i^2$. $h^2$ is fixed on the vertical shaft Y′, geared to the horizontal shaft Z, driven by header-shaft T′.

The screw-driver $i^2$, Figs. 1, 6, 7, 8, removes the finished screw from die J′, being so arranged that as the head of the screw, with the slot just cut by the saw $h^2$, is carried toward it, the slot passes over the point of $i^2$, that is held stationary, parallel to and upon the same horizontal line as the blade of the saw $h^2$. When the two centers coincide the screw-driver commences to revolve in the proper direction, moving back from die J′ at the same time. By the revolution of the screw-driver the screw is drawn out from the die J′, and dropped, all finished, into a receptacle provided for it. $i^2$ resumes it former state of rest until another screw is provided for its services.

The motions are initiated and regulated as follows: $i^2$ is inserted in the end of a horizontal shaft, $C^2$. Arm $D^2$, secured to shaft $E^2$, connects $C^2$ and $E^2$, allowing $C^2$ free revolution, but causing $C^2$ $D^2$ $E^2$ to move back from die J′ when the lower part of $D^2$ is operated upon by wedge $G^2$, attached to slide-bar $A^3$, that is moved by cam $B^3$, spring $m^2$ producing return motion when wedge $G^2$ is being withdrawn. Revolution of shaft $C^2$ at proper times is produced by gear $H^2$, placed upon it and receiving constant revolution from a gear upon the header-shaft. $H^2$ has an inclined notch, $n^2$, Fig. 7, in its center orifice.

In a longitudinal slot formed in an enlarged part of shaft $C^2$ there is inserted a spring clutch-dog, $p^2$, Figs. 6, 15, a spring, $r^2$, pressing the tooth of dog $p^2$ into the notch $n^2$, causing shaft $C^2$ to revolve in unison with gear $H^2$. To withdraw the tooth of dog $p^2$ from gear $H^2$ and stop the revolution of shaft $C^2$, there is placed upon shaft $E^2$ a collar, $I^2$, with a finger, $t^2$, so arranged that $t^2$ can be swung to and from the shaft $C^2$, and by bringing the point of finger $t^2$ sufficiently near to shaft $C^2$ when it is revolving the shorter part of dog $p^2$ comes around in contact with the inclined point of finger $t^2$, drawing the longer part from contact with gear $H^2$. As $C^2$ stops the instant that dog $p^2$ is fairly withdrawn, it ($C^2$) always stops very near the same point. In order to bring the point of the screw-driver into perfect position to receive the slot of the next screw, part of a collar, $L^2$, fixed to $C^2$, is flattened, and the upper end of a lever, $y^3$, (pivoted on the side of arm $D^2$,) is firmly pressed against the flattened portion of $L^2$. In the same manner the finger $t^2$ is swung toward the shaft $C^2$, viz: Finger $t^2$ and lever $y^3$, both prevented from swinging too far from $C^2$, have projections $s^2$ below their centers that engage with hooks $v^2$ and $x^2$, attached to and moving with wedge $G^2$ by connections $J^2$ and $K^2$, upon connection $J^2$ there being a shoulder, $w^2$, that, as the wedge $G^2$ commences to move for the purpose of drawing the screw-driver back from the die J′, swings the finger $t^2$ clear of the dog $p^2$, allowing the screw-driver to revolve as desired.

Now, with the various parts of my improved screw-machine properly assembled upon the frame A, and the chuck W, with the jaws $i$, open back on the hollow spindle, tube S is inserted into the hollow spindle E and the hooked end of the sliding shaft T dropped into the groove $s$. A rod, $p$, having a hook or other projection, $r$, Fig. 5, is introduced the proper distance through the tube S, collar $n$, chuck-jaws $i$, and bushing $m'$. Power is applied to the pulley G, and the hollow spindle and its attachments commence to revolve. Upon handle P being locked the cam-shaft M commences operating, causing the chuck-jaws to close upon the rod $p$ so as to secure it firmly, the burring-tool $n'$ dropping into position. The chuck, with the rod in its grasp, then commences to move forward, pressing the end of the rod against the cutting-edges of the burring-tool (which reduces the rod to the desired size for the body of the screw) until the body is of proper length, the chuck then stopping its forward motion, and the burring-tool moving farther off and away from the just-formed screw-body.

The die J′ then advances and cuts the thread the proper distance up the body of the screw, when dogs $t'$ $v'$ are thrown out, and the die is allowed to revolve in unison with the rod $p$, receiving motion therefrom. While these operations have been taking place parting-tool R′ has been advancing and severing the rod the proper distance from the body to form the head, and very shortly after the die commences to revolve the separation is effected. From this point until the die is threading another screw there are two cycles of operations taking place. By one, the chuck, making retrograde motion, grasps and feeds forward another screw-length to the burring-tool. By the other, the die, retaining the partially-formed screw, carries it to the header $f^2$, to have the head formed as desired; then to the saw $h^2$, that slots the head, and, last of all, to the screw-driver $i^2$, that removes and drops the now finished screw, the die then returning to a position before the bushing $m'$, where the burrer $n'$ has just shaped another screw-body. These operations continue until the successive motions of the chuck W have drawn the projection $r$ formed upon the rod $p$ against the collar $n$ in the hollow tube S, when S slides the shaft in the same direction that the rod is being fed, collars $v$ moving arm V toward the fulcrum of lever R, detaching the hook upon R from pin $i$, causing the cam-shaft M, by the operation before described, to come to rest until the attendant has withdrawn the tube S, removed the short remainder of the rod $p$, and introduced, as before, another rod.

The advantages attendant upon my invention are many and important. It enables one attendant to operate several machines. The automatic stop prevents the short remainder from injuring the various operating parts of the machine should the attendant be absent or heedless. The revolution of the die produces a more perfect head, the use of the rod for that purpose producing that result in the simplest manner. The machine, being automatic, produces the best class of screws and adds to the durability of the tools.

Having thus fully described my invention, what I claim as new, and desire to secure by Letters Patent, is—

BEST AVAILABLE COPY

1. The combination of the hollow spindle E and the mechanism to revolve the same, the chuck W, having an elongated hub, mounted on said spindle and revolving with it, and mechanism to move said chuck reciprocally and longitudinally upon said spindle to feed the wire at intervals through the spindle and to the screw-making tools, substantially as described.

2. The combination, with the revoluble hollow spindle E and the chuck W, revolving with and movable reciprocally thereon, as described, of the cutter R′ and the screw-cutting die J′, arranged and operating substantially as set forth.

3. The combination, with the revoluble hollow spindle E and the chuck W, revolving with and movable reciprocally thereon, as described, of a stop located in said spindle, and mechanism put in operation by the obstruction caused by said stop, that disconnects the driving mechanism, causing the machine to cease its operations and to permit the removal of the end of the exhausted wire or rod and the insertion of a fresh wire or rod, substantially as described.

4. The combination, with the gear-wheels K L and shaft H, of the bar and wedge I J N O, crank-rod *h*, and lever P, substantially as and for the purposes herein set forth.

5. The combination of the lever P, hooked lever R, rod T, and mechanism to reciprocate the same, arm V, and springs *k*, *m*, and *w*, all substantially as and for the purposes herein set forth.

6. The combination of the rod T, by means of its hook *t*, with the tube S, grooved and otherwise constructed as described, the tapering collar or plug *n* within said tube, the hooked rod *p*, and reciprocating jaws for grasping said rod and feeding it forward to the screw-making instrument, substantially as herein set forth.

7. The hollow spindle E and springs *x*, the chuck W, sliding on said spindle over the springs and provided with elongated hub, grooved collar Z, pins *f′*, buttons *h′*, levers *e′*, and jaws *i′*, all constructed and arranged to operate substantially as and for the purposes herein set forth.

8. The combination, with the subject-matter of the seventh clause, of the forked arm *y*, shaft X, spring *z*, and wedge Y, and mechanism to reciprocate said wedge, substantially as and for the purposes herein set forth.

9. The combination of the chuck W, collar Z, arm C′, pin *d′*, sleeve D′, spring-jaws *e′ e′*, and slide A′, all constructed and arranged to operate substantially as and for the purposes herein set forth.

10. The combination of the burrer *n′*, rocking arm G′, shaft H′, spring *r′*, and guide-pin *p′*, all constructed and arranged as described, and operated by means of the wedges I′ I′ on the slide $A^5$, substantially as and for the purposes herein set forth.

11. The combination of the die J′, shaft K′, spring *y′*, reciprocating carriage L′, shafts M′ and P′, arm N′, spring *g′*, and reciprocating wedge O′, all substantially as and for the purposes herein set forth.

12. The combination, with the carriage L′, shaft K′, and spring *y′*, of the cog-wheel *s′*, dogs *t′* and *v′*, and their springs *w′*, the gage $d^2$, and incline $e^2$ all constructed and arranged to operate substantially as and for the purposes herein set forth.

13. The combination, with the die J′ and chuck W, of the knife R′, standard *s*, and the rod *p*, slide $A^4$, and cam and spring $B^4$, substantially as and for the purposes herein set forth.

14. The combination of the header $f^2$, shafts T′ and W′, arm V′, spring $l^2$, reciprocating wedge X′, spindle E, and the gear-wheels connecting shaft T′ with said spindle, substantially as and for the purposes herein set forth.

15. The combination of the screw-driver $i^2$, shafts $C^2$ $E^2$, connecting-arm $D^2$, spring $m^2$, reciprocating wedge $G^2$, cog-wheel $H^2$, and the cog-wheel on the header-shaft T′, substantially as and for the purposes herein set forth.

16. The combination of the reciprocating carriage L′, die J′, mechanism for operating said die, as described, the vertical revolving shaft *y′*, and the horizontally-operating saw $h^2$, substantially as and for the purposes herein set forth.

17. The combination of the screw-driver shaft $C^2$, cog-wheel $H^2$, with notch $n^2$, cogs $p^2$, and spring $r^2$, the collar $I^2$, pawl $t^2$, pin $s^2$, and reciprocating arm $J^2$, with hook $v^2$ and shoulder $w^2$, all substantially as and for the purposes herein set forth.

18. The combination of the collar $L^2$, with notch $z^2$, lever $y^2$, and reciprocating arm $K^2$, with hook $x^2$, all substantially as and for the purposes herein described.

In testimony that I claim the foregoing I have hereunto set my hand this 31st day of August, 1871.

FRANCIS CURTIS.

Witnesses:
E. W. STODDARD,
E. B. CAMPBELL.